A. J. ROBINSON.

Filters.

No. 130,316. Patented Aug. 6, 1872.

Witnesses.
Richard H. Reille
M. J. Clark.

Inventor.
A. J. Robinson

UNITED STATES PATENT OFFICE.

ANDREW J. ROBINSON, OF TROY, NEW YORK.

IMPROVEMENT IN FILTERS.

Specification forming part of Letters Patent No. 130,316, dated August 6, 1872.

Specification describing a certain new and useful "Improvement in Water-Filters," invented by ANDREW J. ROBINSON, of the city of Troy, county of Rensselaer and State of New York.

The nature of my invention consists in the construction and arrangement of an air-tight water-filter to be applied at any desired point between the source of supply and the outlet, and used in connection with water-pipes, cisterns, hydrants, or other places where desired.

Description of the Drawing.

Like letters refer to like parts.

General Description.

Figure 1:
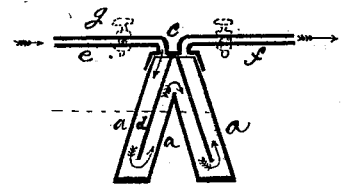
Figure 1 is a vertical section of the water-filter.
Figure 2:
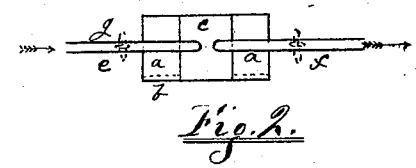
Fig. 2 is a horizontal view.
Figure 3:
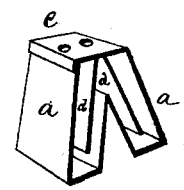
Fig. 3 is the filter box or duct in perspective, with one side removed.
Figure 4:
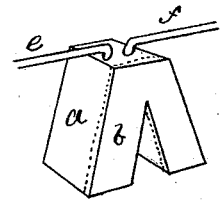
Fig. 4 is the whole filter complete in perspective.
Figure 5:
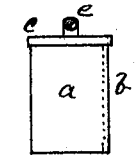
Fig. 5 is an end elevation.
Figure 6:
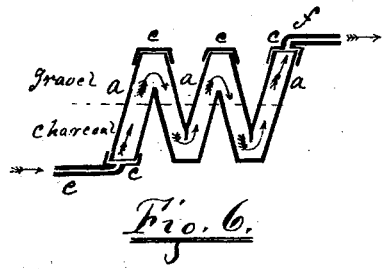
Fig. 6 is a vertical section of what I deem an equivalent device.
Figure 7:
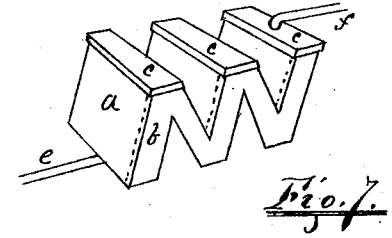
Fig. 7 is the same in perspective.
Figure 8:
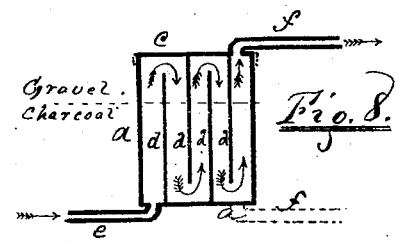
Fig. 8 is a vertical section of another equivalent device.

$a$ represents the box or casting. $b$ represents one end thereof, which is cast or formed separate for convenience of construction, and fitted close in any proper manner to make it water-tight. $c$ represents the removable cap, cast or otherwise formed to fit tightly on top of said box, about as shown, and water-tight. $d\ d$ represent partitions, of which there may be any suitable number, placed therein in any suitable manner or position, but I prefer them as shown, and cast with the box $a$. $e$ represents the inlet-pipe, and $f$ represents the outlet-pipe. The inlet and outlet are through the cap or caps, as shown. The box, when completed, forms substantially a continuation of said pipes or ducts. The course of the currents are indicated by the arrows on the drawing. The caps are so attached that they can be readily removed separately, or the box be removed therefrom, in the case of construction shown in Figs. 1, 2, 3, 4, and 5, without detriment to the pipes, and the old charcoal, gravel, &c., removed, and fresh applied whenever desirable, a stop-cock, shown at $g$, shutting off the water-inlet when necessary.

The usual custom in filters where charcoal and gravel are used is to mix them or so place them that they become soon mixed by the action of the water. I arrange them so that the water passes through alternate courses of the same, whereby the water becomes better purified, and by my arrangement and construction they are kept always separate.

The equivalent devices shown operate in the same manner substantially, but there are difficulties of construction and in getting them tight, &c., which cause me to consider the first shown the best, as it is also, I believe, the cheapest.

What I claim as new, and desire to secure by Letters Patent, is—

1. The box-filter $a$, with cover or end $b$ and cap or caps $c$, constructed and arranged substantially as and for the purposes herein set forth.

2. The within-described water-filter, consisting of the box $a$, with cover or end $b$, cap or caps $c$, and one or more interior partitions, $d$, with gravel and charcoal or other suitable filtering material, and arranged with the water-pipes $e f$ substantially as shown and described, and for the purposes set forth.

A. J. ROBINSON.

In presence of—
RICHARD H. REILLE,
LEWIS CHAPIN.